United States Patent [19]

Tobiasz

[11] Patent Number: 5,443,143
[45] Date of Patent: Aug. 22, 1995

[54] CLUTCH RELEASE APPARATUS

[75] Inventor: Andrae Tobiasz, Sur Seine, France

[73] Assignee: Automotive Products, France, SA, Herblay-Cergy-Pontoise, France

[21] Appl. No.: 244,237

[22] PCT Filed: Sep. 17, 1993

[86] PCT No.: PCT/EP93/02513

§ 371 Date: May 13, 1994

§ 102(e) Date: May 13, 1994

[87] PCT Pub. No.: WO94/07047

PCT Pub. Date: Mar. 31, 1994

[30] Foreign Application Priority Data

Sep. 17, 1992 [FR] France ................. 92 11236

[51] Int. Cl.⁶ ............................................. F16D 25/08
[52] U.S. Cl. ......................... 192/85 CA; 192/91 A; 192/98
[58] Field of Search ............. 192/85 CA, 91 A, 98, 192/101, 110 B; 92/135

[56] References Cited

U.S. PATENT DOCUMENTS

| | | | |
|---|---|---|---|
| 3,912,058 | 10/1975 | Parkins | 192/91 A X |
| 3,955,660 | 5/1976 | Poon et al. | 192/91 A |
| 4,117,917 | 10/1978 | Ladin et al. | 192/98 |
| 4,456,111 | 6/1984 | Limbacher | 192/91 A X |
| 4,585,107 | 4/1986 | Leigh-Monstevens | 192/98 X |
| 4,650,054 | 3/1987 | Fädler | 192/101 X |
| 4,660,702 | 4/1987 | Flotow | 192/98 |
| 4,778,039 | 10/1988 | Eliasson | 192/85 CA |
| 4,869,355 | 9/1989 | Corral et al. | 192/98 |
| 4,913,276 | 4/1990 | Hayashi et al. | 192/98 X |
| 5,083,649 | 1/1992 | Baer | 192/85 CA X |
| 5,287,951 | 2/1994 | Voit et al. | 192/85 CA |

FOREIGN PATENT DOCUMENTS

2245329 1/1992 United Kingdom ........ 192/85 CA

*Primary Examiner*—Andrea L. Pitts
*Attorney, Agent, or Firm*—Paul E. Milliken; Lee A. Germain

[57] ABSTRACT

A hydraulic annular slave cylinder (16) for a motor vehicle clutch having an annular body (21) with inner and outer cylindrical sidewalls (22, 23) having a fluid chamber (55) formed therebetween. The inner sidewall (22) extends axially beyond the outer sidewall (23) and a piston member (41) is sealingly slideable on the radially outer surfaces of the two walls (22, 23). A clutch release bearing (60) is mounted concentrically of the piston member (41) and fluid chamber (55).

7 Claims, 3 Drawing Sheets

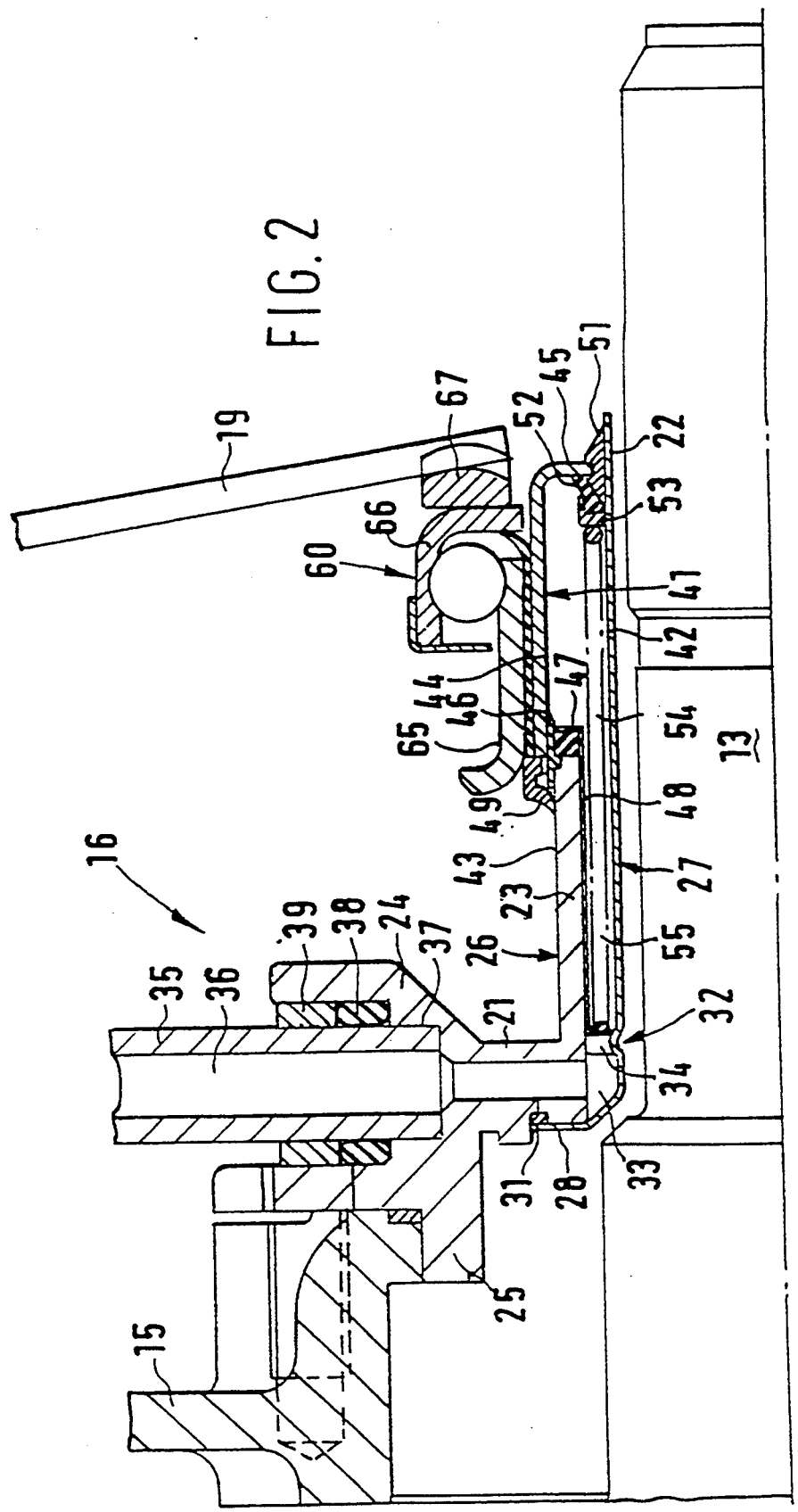

CLUTCH RELEASE APPARATUS

This invention relates to a clutch release apparatus for use with motor vehicle clutch actuation systems.

Motor vehicle transmissions frequently comprise a clutch and a gear box whose input shaft is driven through the clutch so that the drive of the gearbox can be broken by operation of a hydraulicably operable slave cylinder. It has become more common for the slave cylinder to be an annular slave cylinder arranged concentrically of the gear box input shaft.

The concentric slave cylinder is frequently fixed to a face of the gearbox housing within the confines of the gearbox bell housing. Due to dimensional limitations it is becoming necessary for the concentric slave cylinder to become more compact.

Accordingly there is provided a hydraulic annular slave cylinder for a motor vehicle clutch comprising an annular body having inner and outer cylindrical walls forming a hydraulic chamber therebetween, a piston member responsive to hydraulic pressure within the chamber and a release bearing characterised in that the release bearing is mounted on the piston member so that the bearing is concentric with a hydraulic fluid chamber.

Preferably the inner wall extends axially beyond the outer wall and the piston member is sealingly slideable on the radially outer surfaces of the two walls.

The piston member may be sealed to the inner wall by a first seal mounted on the piston member and may be sealed to the outer wall by a second seal mounted on the outer wall.

Preferably the piston member comprises a cylindrical side wall and a radially inwardly projecting flange at one end thereof, the cylindrical side wall being slideably supported on the radially outer surface of the outer cylindrical wall, and radially inner flange sealingly engaging the radially outer surface of the inner wail, and annular relase bearing may be concentric with the fluid chamber formed by the piston member.

The piston member may further include a secondary piston slideably mounted thereon, the secondary piston forming a second fluid chamber, and the annular release bearing is concentric with the second fluid chamber.

Preferably an annular release bearing is mounted on the outer surface of the cylindrical sidewall of the piston member.

The invention will be described by way of example and with reference to following drawings in which:

FIG. 2 is a longitudinal cross section through a first slave cylinder according to the invention.

Figure 1:
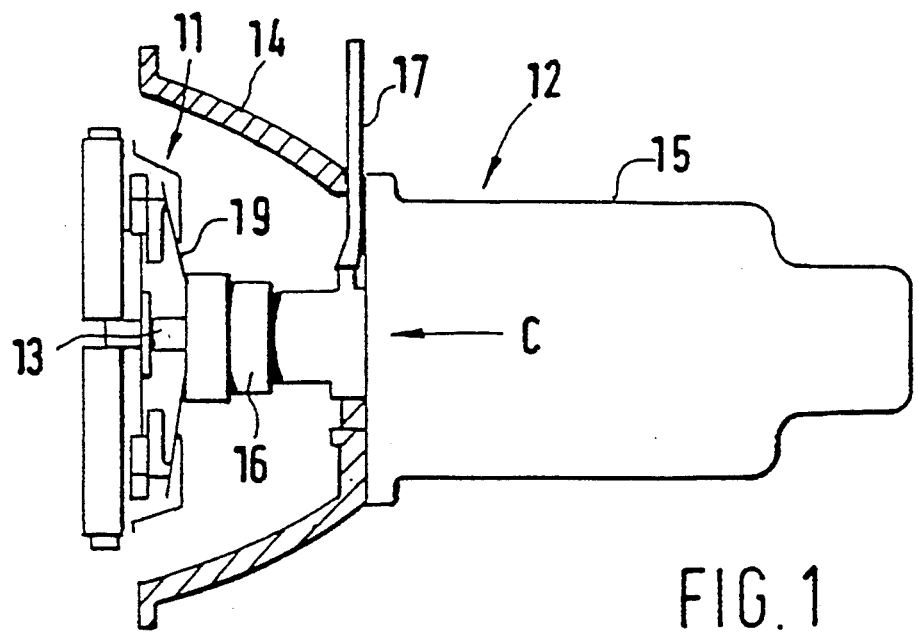
FIG. 1 is a schematic drawing showing a gearbox and clutch assembly for a transmission.

Now with reference to FIG. 1, a motor vehicle transmission includes a friction clutch 11, and a gear box assembly 12. The gearbox assembly 12 has an input shaft 13 driven by the clutch 11, and a bell housing 14 which houses the clutch and which in use is bolted against a face of an internal compustion engine (not shown).

The clutch 11 is operated by an annular hydraulic clutch slave cylinder 16 arranged concentrically with the gearbox input shaft 13 and in use engages the radially inner ends of the fingers 19 of a diaphragm spring. The slave cylinder is operated by hydraulic fluid pressure generated by a master cylinder (not shown) which is connected to the slave cylinder 16 by conduit 17.

Now with reference to FIG. 2, there is illustrated, in the actuated condition, an annular clutch slave cylinder 16 arranged concentrically with the gearbox input shaft 13. The slave cylinder 16 has an annular body 21 having an inner cylindrical wall 22 and an outer cylindrical wall 23 spaced radially outwardly thereof. The inner wall 22 extends axially beyond the outer wall 23. The body 21 comprises two parts, a first part 26 including the outer wall 23 is formed from cast aluminium or moulded plastics material (such as glass filled nylon) and has a radially outwardly extending flange 24 with an annular boss 25 on its rear face for location in the gear box casing 15, and the second part 27 is an annular sheet metal pressing including the inner cylindrical wall 22 and has a radially outwardly extending flange 28 at its end adjacent the gear box. The second part 27 is assembled to the first part with the flanges 24, 28 held in contact with a seal 31 therebetween to form a fluid chamber 55. The two parts 26, 27 are secured together by swaging radially outwardly projecting ribs 32 in the second part 27 into an interrupted annular groove 34 formed on a plurality of circumferentially spaced radially inward projections 33 on the rear surface of the first part 26.

A spigot 35 having an inlet passageway 36 therein is secured in a stepped diameter inlet port 37 in the flange 24 by means of a seal 38 and securing ring 39.

An annular piston member 41 is slideable on the radially outer surfaces 42, 43 of the inner and outer cylindrical walls 22, 23 respectively. The piston member 41 comprises a cylindrical sidewall 44 and a radially inwardly projecting flange 45 at the end of the sidewall 44 away from the gearbox. The piston sidewall 44 is slideable on the outer cylindrical wall 23 and is sealed thereto by a plastics sealing ring 46 mounted on the outer wall 23 adjacent the end thereof, and is resiliently biased against the inner surface of the piston sidewall 44 by an elastomeric ring 47. The elastomeric ring 47 is held in postion by a cylindrical retainer cap 48 whose open base sits against the projections 33.

A dust seal 49 prevents dirt or other contaminants from entering between the piston and cylinder.

The flange 45 slides on the outer surface 42 of the inner wall 22 by means of a bearing ring 51 mounted on the radially inner edge of the flange 45, and is sealed against the outer surface 42 by an adjacent elastomeric annular seal 52 held in an 'L' section plastics retainer ring 53.

The piston member 41 is biased away from the gearbox by concentric spring 54, housed in the annular hydraulic chamber 55 formed between the two cylindrical wails 22, 23 and acting between the retainer ring 53 and the base of the retainer cap 48.

An annular bearing 60 is secured concentrically to the piston sidewall 44 with its stationary bearing race 65 fixed to the piston sidewall 44 by any suitable material such as, adhesive, an interference fit, or resilient spring clip. With the slave cylinder 16 in the "at-rest" condition the release bearing 60 is concentric with (i.e. radially outboard of) the fluid chamber 55 so that the axial length of the cylinder/bearing combination is reduced. The rotary race 66 carries an intermediate annular plate 67 that abuts the inner ends of the spring fingers.

In the "at-rest" condition the spring fingers 19 bias the piston member 41 towards the flanges 24, 28.

In use, a master cylinder generated hydraulic pressure enters the slave cylinder 16 through the spigot 35 and inlet port 37 and enters the chamber 55 through the gaps between circumferentially spaced projections 33. The piston member 41 moves axially away from the end flanges 24, 28 and applies a release load to the diaphragm spring fingers 19.

Figure 3:
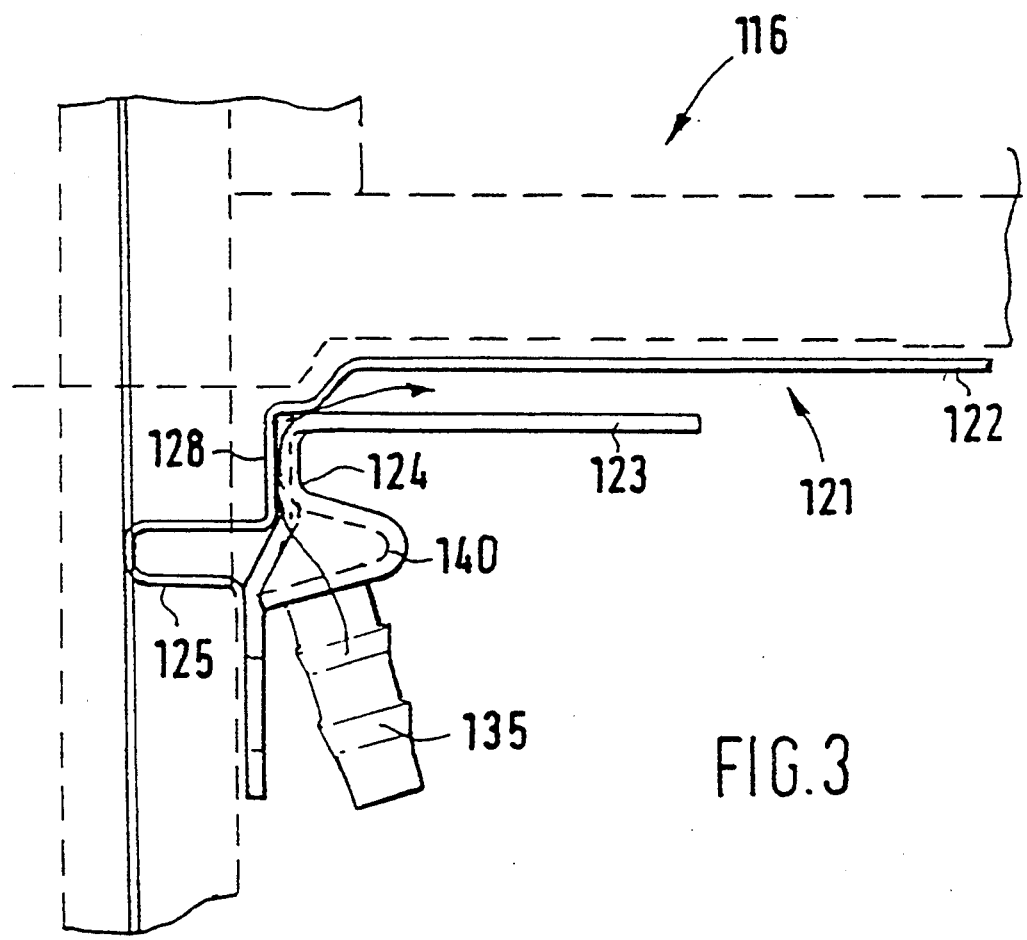
FIG. 3 is a cross section through a second slave cylinder showing the construction of the body only.

Now with reference to FIG. 3, the slave cylinder 116 has an annular body 121, formed from two sheet metal pressings 122, 123 which are welded together through their end flanges 128, 124 respectively. The inlet spigot 135 is fixed to a raised attachment point 140 formed on the end flange 124 of the outer cylindrical wall 123. An annular boss 125 is formed on the rear face of the flange 128 of the inner cylindrical wall 122 for location to the gearbox housing.

Figure 4:
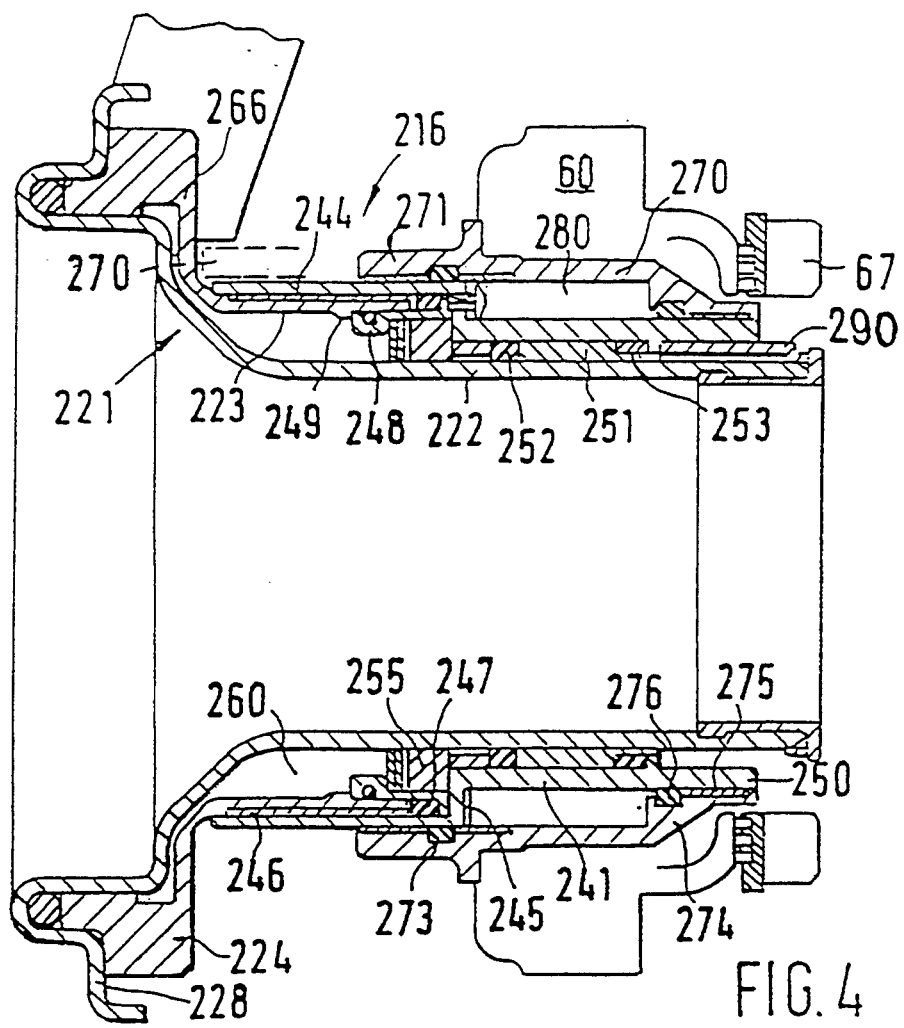
FIG. 4 is a cross section through yet another embodiment of the invention.
Figure 5:
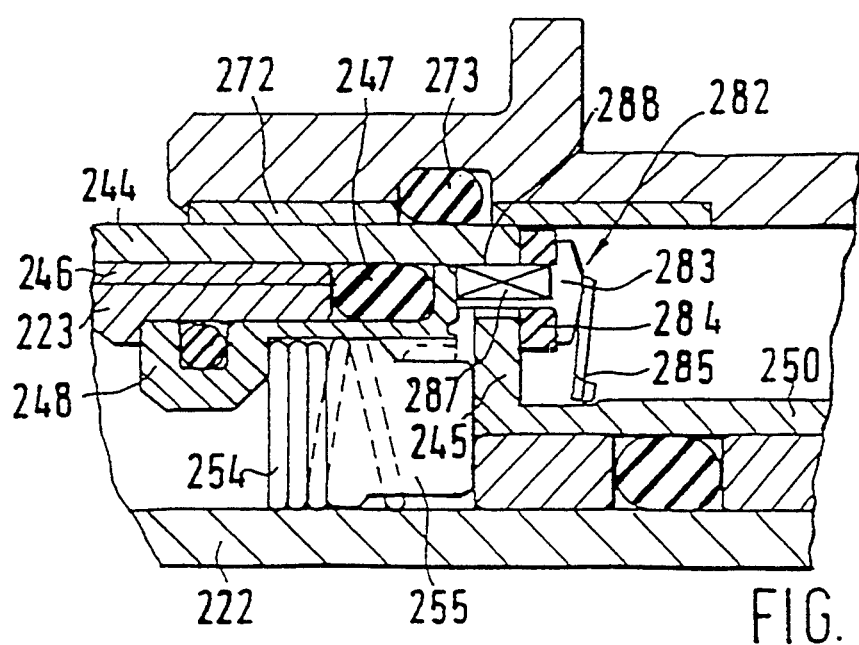
FIG. 5 is an enlargement of a portion of FIG. 4 showing the valve mechanism.

With reference to FIG. 4 and FIG. 5, the slave cylinder 216 has a body 221 comprising a cast aluminium or moulded plastics first part 266 which includes the outer cylindrical wall 223, and a sheet metal second part which includes the inner cylindrical wall 222. The two parts 222, 223 are joined together at the respective end flanges 224, 228.

The annular primary piston member 241 is sealingly slideable on the radially outer surface of the inner and outer cylindrical walls 222, 223. The piston member 241 comprises a radially outer cylindrical sidewall 244, a radially inwardly extending flange 245 and a radially inner cylindrical side wall 250. The piston outer sidewall 244 is slideable on a plastics sealing ring 246 mounted on the outer surface of the outer wall 223 and an elastic sealing ring 247 is held in position by a retainer cup 248 which sits on an annular shoulder 249 on the radially inner surface of the outer wall The piston inner sidewall 250 slides on a plastics sealing ring 251 mounted on the radially inner surface of the piston inner sidewall, together with an elastomeric seal 252 acting between the inner sidewall 250 and the inner cylindrical wall 222 of the body 221, and an elastomeric ring 253 which acts to bias the sealing ring 251 against the inner cylindrical wall 222.

The primary piston member 241 is biased away from the gear box by an annular spring 254 and an annular follower 255 located within the hydraulic chamber 260 formed between the two walls 222, 223 of the body 221. The annular spring 254 preloads the piston member 241 against the diaphragm spring fingers 18 and acts only for the initial piston travel. The spring 254 can be a coil spring or a belleville spring and reacts against the retainer cup 248.

A secondary piston 270 is sealingly slideable on the primary piston member 241, and comprises a radially outer sidewall 271 having a plastics ring 272 and elastomeric seal 273, that seals against the outer sidewall 244 of the piston member 241, and a radially inwardly projecting flange 274 having a plastics seal ring 275 and elastomeric seal 246 that seals against the inner sidewall 250, to form a secondary hydraulic chamber 280. The secondary hydraulic chamber 280 is connected to the first hydraulic chamber 250 through a valve means 282.

The valve means 282 is mushroom shaped having a head 283 and a stem 287 which passes through an orifice 288 in the flange 245 of the piston member 241. The head 283 of the valve means is located in the secondary chamber 280 and is biased into a closed condition against a seal 284 by an annular belleville spring 285.

The stem 287 of the valve means 282 can contact the retainer cup 248 when the piston means 241 is in a fully retracted condition and cause the valve means to open.

The annular clutch release bearing 60 is secured on the outer surface of the secondary piston 270 and its rotary race is connected to an intermediate plate 67 to abut the fingers of a diaphragm spring as previously described. The bearing 60 is concentric with (i.e. radially outboard of) the secondary hydraulic chamber 280 so that the axial length of the cylinder/bearing combination is again reduced.

On initial fitting to a vehicle the piston member 241 is held in position shown in FIG. 4 by plastics delivery stops 290. When pressurised hydraulic fluid is introduced into the slave cylinder 216 it will fill the two chambers 260 and 280. A further pressure will cause the secondary piston 270 to move the bearing plate 67 into abutment with the diaphragm spring fingers. The area of the secondary piston 270 exposed to fluid pressure is about 60% of the area of the primary piston member 241 exposed to fluid pressure. Thereafter as fluid pressure builds up the stops 290 either burst or may be removed in other ways and the primary piston member 241 will then move to operate the clutch by exerting a release load on the diaphragm spring fingers. This allows the valve means 282 to close isolating the secondary chamber 280. When the fluid pressure is released the spring fingers will push against the secondary piston 270, but since the valve means 282 is closed, the primary piston 241 is returned by the load in the diaphragm spring fingers acting on the secondary piston 270 until the flange 245 abuts the spring follower 255 and is held away from the fully retracted condition in an "at rest condition" by the spring 254 at which point the valve means 282 is held closed by the spring 285.

As the clutch plate wears, the ends of the diaphragm spring fingers move towards the gearbox pushing the primary piston member 241 and secondary piston 270 further back towards the flanges 244, 228 causing the valve means 282 to abut the retainer cup 248 and open, consequently allowing fluid to exit the secondary chamber 280 through the valve means 282 and the length of the secondary chamber 280 to decrease.

When the diaphragm spring fingers exert substantially no load on the secondary piston 270 the spring 254 exerts a preload on piston means 241 to move the piston means 241 away from the retainer cup 247 and the valve means 282 will close.

This effectively means that in an equalibrium condition in which there is substantially no hydraulic pressure in the chamber 260, the spring 254 maintains the valve 282 in a closed condition.

Eventually the secondary piston 270 will abut the flange 224, as shown in dotted outline, when the clutch is fully worn.

The slave cylinders described with reference to FIGS. 2, 3, and 4 may be utilised with prefilled clutch hydraulics systems of the type described in European Patent 0 146 283.

I claim:

1. A hydraulic annular slave cylinder for a motor vehicle clutch comprising an annular body having inner and outer cylindrical walls forming a hydraulic chamber therebetween, a primary piston displaceable in response to hydraulic pressure within the chamber, a secondary piston mounted on the primary piston and displaceable therewith, and a release bearing operatively connected with the secondary piston, the secondary piston forming with the primary piston a second hydraulic chamber of variable length and volume and being connected to the first hydraulic chamber through a valve means so that the length of the secondary chamber and hence the position of the secondary piston relative to the primary pistons is adjustable to compensate for clutch wear.

2. An annular slave cylinder as claimed in claim 1 in which the primary piston includes a radially outer cylindrical sidewall which is slidably supported on a radially outer surface of the outer cylindrical wall, a radially inwardly projecting flange, and a radially inner cylindrical wall which sealingly engages the radially outer surface of the outer wall, and the secondary piston comprises an outer cylindrical wall which slidably engages the outer cylindrical sidewall of the primary piston and a radially inwardly projecting flange which sealingly engages the inner cylindrical sidewall of the primary piston.

3. An annular slave cylinder as claimed in claim 1 in which the valve means is arranged to be open when the primary piston is in fully retracted condition, and to be closed when the primary piston is held in an "at-rest" condition away from the retracted condition allowing the secondary piston to retract relative to the primary piston when the valve means is open to compensate for clutch wear.

4. An annular slave cylinder as claimed in claim 3 in which the valve means is a mushroom valve having a head and a stem, the stem extending through an orifice in the flange of the primary piston and the head being biased against a seal in the closed condition, the stem being abutable against a fixed location on the annular body to open the valve means.

5. An annular slave cylinder as claimed in claim 1 in which the area of the secondary piston exposed to fluid pressure is up to 60% of the area of the primary piston exposed to fluid pressure.

6. A clutch release apparatus as claimed in claim 1 in which the release bearing is mounted on the secondary piston concentrically of the second hydraulic chamber.

7. An annular slave cylinder as claimed in claim 1 in which the outer cylindrical wall and an end flange thereof are formed from a moulding or casting, and the inner cylindrical wall is formed from a sheet metal pressing, and the inner wall is secured to the outer wall by deforming a portion of an end flange of the inner wall around a portion of the end flange of the outer wall.

* * * * *